(No Model.)

W. C. SNOW.
PACKING AND STORING VESSEL.

No. 587,876.

Patented Aug. 10, 1897.

Witnesses
Chas. K. Davies.
Morris Price.

Inventor
Wm. C. Snow
By W. A. Bartlett
atty.

United States Patent Office.

WILLIAM C. SNOW, OF PENN YAN, NEW YORK.

PACKING AND STORING VESSEL.

SPECIFICATION forming part of Letters Patent No. 587,876, dated August 10, 1897.

Application filed September 22, 1896. Serial No. 606,657. (No model.)

*To all whom it may concern:*

Be it known that I, WILLIAM C. SNOW, residing at Penn Yan, in the county of Yates and State of New York, have invented certain new and useful Improvements in Packing and Storing Vessels, of which the following is a specification, reference being had therein to the accompanying drawings.

This invention relates to a vessel for retaining, preserving, and transporting a liquid or liquids.

The object of the invention is to so inclose a liquid for preservation or transportation—such as, possibly, wine or other liquids, and especially milk—that the expansion and contraction of the liquid in the vessel shall be provided for and movement of the liquid within the vessel be prevented or minimized, especially all churning motion of the liquid.

Heretofore it has been common to transport milk and other fluids in sealed jars, but it has been generally impracticable to fill the jars absolutely full, as a change of temperature might cause such expansion as to either produce leakage or break the vessel, while contraction of the liquid was generally followed by the entrance of air, after which the sealing is not usually reliable.

To carry out my invention, I take a jar having a cover which may be securely fastened. The jar is filled with liquid at a low or moderate temperature. In transporting milk I prefer that the jars be filled with milk below 40° Fahrenheit. I place on top of the liquid a flexible diaphragm, which may be of deodorized rubber which is elastic, or may be celluloid or air-proof fabric, or other flexible material. The diaphragm is held in contact with the surface of the liquid. The cap or cover holds the diaphragm in place, but in such cap there is a chamber above the diaphragm into which the diaphragm will yield under pressure from the liquid, but will always remain in contact with the surface of the liquid. If a small quantity of air is inclosed with the liquid such air can neither escape nor receive accession by the yielding of the diaphragm.

As my invention may be carried out in various ways I will explain various mechanisms which may be used.

Figure 2:
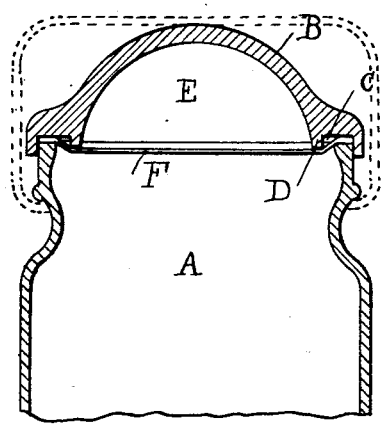
Figure 4:
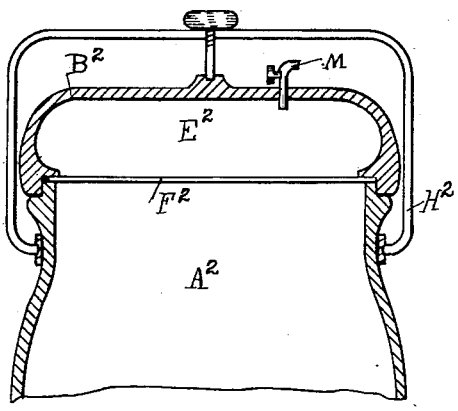
Figure 1:
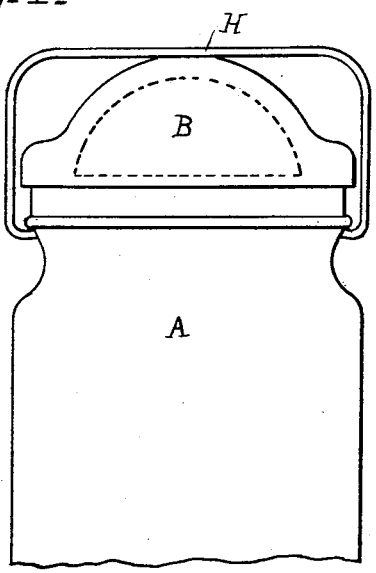
Figure 3:
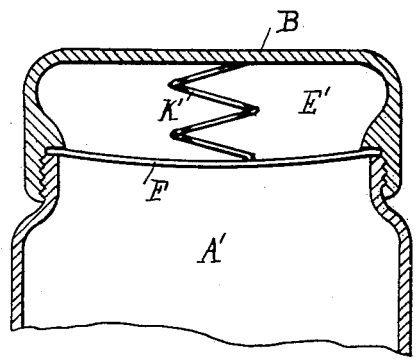

Figure 1 is a side elevation of the upper portion of a glass or porcelain jar and cover, and Fig. 2 is a vertical central section thereof. Fig. 3 is a vertical central section of a portion of a jar, cover, diaphragm, and spring bearing on the diaphragm. Fig. 4 is a sectional view of jar, top, cover, diaphragm, and means for retaining air-pressure on the diaphragm.

A, Figs. 1 and 2, indicates a jar of any usual form, preferably glass or porcelain, but possibly of other rigid material.

B indicates a rigid cover or cap, which, as shown in Fig. 2, has a groove C near its outer edge, and a ring D projecting down a little below and inside of the cap. An air chamber or space E, inside of ring D, permits the elastic diaphragm F to yield upward under pressure from below, and the chamber will be large enough to allow for the expansion of the liquid in the jar.

The cover B may be held down by any usual fastening device—as, for instance, the wire bail H.

When the jar has been entirely filled with liquid, preferably at a low temperature, the diaphragm F is applied and the cap B brought down thereon. The edge of the diaphragm is firmly clasped between the top of the jar and the cover, and a tight joint is thus formed. The ring or flange D at the same time applies a pressure to the diaphragm, causing it to come firmly down upon the surface of the liquid, and if the liquid is thereby depressed it will rise toward the middle of the diaphragm, carrying the yielding diaphragm with it. When the jar is thus sealed and the cover fastened, any expansion of the liquid will lift the central part of the elastic diaphragm. Should there be subsequent contraction, the elasticity of the diaphragm will hold the diaphragm in close contact with the surface of the liquid, thereby preventing motion of the liquid in the jar.

In Fig. 3 the jar A' has a screw cap or cover B', provided with a chamber E'. The flexible diaphragm F' is held down to the liquid by a spring K', which permits a yielding of the diaphragm under expansion, but holds it in contact with the surface of the liquid.

In Fig. 4 an ordinary form of cap $B^2$ and fastening device $H^2$ is applied to a jar $A^2$. The flexible diaphragm $F^2$ is held down against the surface of the liquid by the pressure of compressed air or gas in the chamber $E^2$, the same being applied in any suitable way, as through cock M.

Rubber gaskets may be used to make tight joints with any of the modifications, the same being common.

It will be understood that there are many ways of carrying out my invention. The leading idea involved is that the liquid shall be so confined as to allow little or no churning within the vessel, but that contraction and expansion may be allowed and compensated for by means of the flexible covering on the liquid.

What I claim is—

1. The combination with a jar and a rigid closed cover therefor, said cover provided with a chamber, of a flexible diaphragm sealed at the edges between the jar and cover, said cover having a bearing-surface extending below the top of the jar by which the diaphragm is pressed down upon the liquid, substantially as described.

2. The combination with a jar of an elastic imperforate flexible diaphragm extending across the mouth thereof and resting on the top of the jar, a rigid cap or cover having its rim resting on said diaphragm and sealing the same to the jar, said cover having a chamber above the central portion of said diaphragm, and means for securing said cover in position, whereby cover and diaphragm are retained, all substantially as described.

3. The combination with the jar of an elastic flexible imperforate diaphragm extending across and resting on the top thereof, the cover having its edge resting on said diaphragm and sealing the same to the jar, means for securing the cover to the jar and thereby sealing the parts together, the cover having a chamber above the central portion of the diaphragm, and elastic means for compressing the diaphragm below the chamber in the cover, all combined substantially as described.

In testimony whereof I affix my signature in presence of two witnesses.

WILLIAM C. SNOW.

Witnesses:
W. A. BARTLETT,
THOS. J. STALEY.